(12) United States Patent
Ishikawa et al.

(10) Patent No.: US 7,666,507 B2
(45) Date of Patent: Feb. 23, 2010

(54) ACTIVATED CARBON PRODUCT IN SHEET FORM AND ELEMENT OF DEVICE FOR PREVENTING TRANSPIRATION OF FUEL VAPOR

(75) Inventors: Kenichi Ishikawa, Osaka (JP); Susumu Abe, Okayama-ken (JP); Shizuo Ishimura, Okayama-ken (JP)

(73) Assignee: Kuraray Chemical Co., Ltd., Bizen-shi (JP)

( * ) Notice: Subject to any disclaimer, the term of this patent is extended or adjusted under 35 U.S.C. 154(b) by 0 days.

(21) Appl. No.: 10/560,526

(22) PCT Filed: Jun. 11, 2004

(86) PCT No.: PCT/JP2004/008197

§ 371 (c)(1),
(2), (4) Date: Dec. 13, 2005

(87) PCT Pub. No.: WO2004/110928

PCT Pub. Date: Dec. 23, 2004

(65) Prior Publication Data

US 2006/0141256 A1    Jun. 29, 2006

(30) Foreign Application Priority Data

Jun. 13, 2003   (JP) .............................. 2003-168756

(51) Int. Cl.
*B32B 9/00* (2006.01)
(52) U.S. Cl. ...................................... 428/408
(58) Field of Classification Search ................ 428/408, 428/331; 55/59; 123/519
See application file for complete search history.

(56) References Cited

U.S. PATENT DOCUMENTS 4,289,513 A * 9/1981 Brownhill et al. ............. 96/135

(Continued)

FOREIGN PATENT DOCUMENTS

JP        8-83736        3/1996

(Continued)

OTHER PUBLICATIONS

Steve Albu, "PZEV Emissions Technology TOPTEC: Regulations and Challenges" A focused TOPical TEChinical Workshop Sponsored by SAE's Continuing Professional Development Group; Jan. 24-25, 2002 Hilton San Diego Resort San Diego, California; (14pp.).

(Continued)

*Primary Examiner*—David R Sample
*Assistant Examiner*—Daniel Miller
(74) *Attorney, Agent, or Firm*—Oblon, Spivak, McClelland, Maier & Neustadt, L.L.P.

(57) ABSTRACT

To provide an activated carbon sheet molding that can reduce a leak amount of fuel vapor, realize small ventilation resistance, and is excellent in moldability and strength, and an element for a fuel evaporative emission preventing device for preventing evaporative emission of fuel vapor from a fuel tank system and an intake system by using the activated carbon sheet molding. The object can be achieved by an activated carbon sheet molding made of activated carbon that satisfies b/a=0.3 through 0.55 provided that a 100%-concentration n-butane adsorbing amount per 100 parts by weight of activated carbon at 40° C. is defined as a parts by weight, and a 1%-concentration n-butane adsorbing amount is defined as b parts by weight.

12 Claims, 5 Drawing Sheets

U.S. PATENT DOCUMENTS 5,118,329 A * 6/1992 Kosaka et al. ............... 95/143
6,540,815 B1 4/2003 Hiltzik et al.

FOREIGN PATENT DOCUMENTS

| | | |
|---|---|---|
| JP | 9-63907 | 3/1997 |
| JP | 9-192485 | 7/1997 |
| JP | 10-37812 | 2/1998 |
| JP | 2001-240407 | 9/2001 |
| JP | 2001-322872 | 11/2001 |

OTHER PUBLICATIONS

C.L. Mantell, "Adsorption" McGraw-Hill Book Company, Inc. New York and London.; Second Edition, 1951; (3pp.).

* cited by examiner

ACTIVATED CARBON PRODUCT IN SHEET FORM AND ELEMENT OF DEVICE FOR PREVENTING TRANSPIRATION OF FUEL VAPOR

TECHNICAL FIELD

The present invention relates to an activated carbon sheet molding and an element for a fuel evaporative emission preventing device. More specifically, the invention relates to an activated carbon sheet molding that is excellent in adsorption and desorption and preferable for preventing the evaporative emission of organic solvents, in particular, a liquid fuel such as gasoline, and an element for preventing the release of fuel evaporative emission from a fuel tank system or an intake system of a vehicle using the activated carbon sheet molding.

BACKGROUND ART

Recently, concerns about the environment have increased and a great amount of attention is being paid to the prevention of evaporation of organic solvents and a liquid fuel such as gasoline. Fuel evaporation from a vehicle being parked is roughly divided depending on its production source into evaporation from a fuel tank system and evaporation from an intake system. Hereinafter, a fuel evaporative emission preventing device to prevent the release of fuel evaporative emission from a fuel tank system is referred to as a canister, and an element to be used for a fuel evaporative emission preventing device for fuel vapor from an intake system is referred to as an engine air intake element.

Normally, fuel vapor to evaporate from a fuel tank system is adsorbed and collected by an adsorbent housed in the canister. The canister was developed as a fuel evaporative emission preventing device to prevent the release of the liquid fuel vapor represented by gasoline generated from the fuel tank system, and so far many canisters have been developed and loaded and used in vehicles. As a fuel evaporation preventive material to be used in the canister, activated carbon is used in many canisters, and in the canisters, vapor evaporating from the liquid fuel such as gasoline from the fuel tank is adsorbed by activated carbon, and the adsorbed gasoline vapor is desorbed by the air suctioned when an engine is driven, and the desorbed gasoline vapor is guided into an engine intake manifold (hereinafter, abbreviated to intake manifold) and burned by the engine.

Conventionally, to improve the performance of the canister, development of adsorbents excellent in adsorption and desorption of liquid fuel vapor and development of systems were made. As adsorbents, activated carbon such as coconut shell charcoal, wood coal, and coal, etc., and molded charcoal obtained by molding activated carbon were normally used, and for example, molded charcoal obtained by adding short fibers into granular activated carbon and molding it by using an emulsion as a binder is known (Patent Document 1). Modified activated carbon that was oxidized is also known, and it is described that this is particularly effective for a mixed vapor of gasoline and alcohol (Patent Document 2). Furthermore, use of two kinds of activated carbons different in average filling density from each other for a fuel vapor collecting system has also been proposed (Patent Document 3).

Patent Document 1: Japanese Published Examined Patent Application No. S48-7194
Patent Document 2: Japanese Published Examined Patent Application No. H01-52324
Patent Document 3: Japanese Published Examined Utility Model Application No. H05-17411

As an example of an adsorbent developed by focusing on the pore size distribution of activated carbon, a fuel evaporation preventive material made of an activated carbon fiber having a specific pore size distribution has been disclosed (Patent Document 4). In addition, a method for producing an activated carbon that improves the pore size distribution by adjusting the oxygen concentration during heat treatment has been disclosed (Patent Document 5), and as an example developed by focusing on the hardness, an activated carbon having hardness without greatly reducing the pore size has been disclosed (Patent Document 6). Furthermore, an activated carbon regulated by specific adsorption indicated by the butane working capacity and wear rate has been disclosed (Patent Document 7), and a molded activated carbon regulated by a crushing strength and a specific heat has been disclosed (Patent Document 8).

Patent Document 4: Japanese Published Examined Patent Application No. S61-55611
Patent Document 5: Japanese Published Unexamined Patent Application No. H06-127912
Patent Document 6: Japanese Published Unexamined Patent Application No. H04-190846
Patent Document 7: Japanese Published Unexamined Patent Application No. 2000-313611
Patent Document 8: Japanese Published Unexamined Patent Application No. 2001-322872

On the other hand, as an example developed in terms of the system, for example, canisters having an adsorbent formed by laminating a plurality of activated carbon sintered sheets so as to form spaces therein have been disclosed (Patent Documents 9 and 10).

Patent Document 9: Japanese Published Unexamined Patent Application No. H04-265461
Patent Document 10: Japanese Published Unexamined Patent Application No. H07-269421

When a vehicle is parked for a long period of time, gasoline adsorbed by the adsorbent in the canister is emitted to the atmosphere and pollutes the environment, and in particular, in the USA, evaporation from vehicle fuel is strictly regulated. All over the USA, from 2004, vehicle fuel evaporation control regulations called Tier 2, and in California, called LEV II (Low Emission Vehicle II) are due to be enforced, and according to these new regulations, it is required that the evaporative emission of the gasoline while parking for 72 hours, that is, Diurnal Breathing Loss (DBL) is reduced to a value remarkably lower than conventionally.

Furthermore, the p-ZEV (Partial Zero Emission Vehicle) regulation requires a canister to satisfy an emission value of 5 through 15 mg in general, and to realize this value, conventional activated carbons for canisters are not sufficient, and a canister with high performance has been demanded.

However, the canisters described above were developed in view of adsorption and desorption of gasoline vapor in principal, and were not developed by considering the evaporative emission of the gasoline from a vehicle being parked. Adsorption of fuel vapor is realized by only increasing the amount of activated carbon, however, this increases the pressure drop, resulting in lengthening of the fuel feeding period. The inventors developed as a fuel evaporative emission preventing device which is applicable for such objects, a fuel vapor evaporative emission preventing device for a vehicle including a second canister made of an activated carbon honeycomb by extrusion-molding connected after a canister using a granular activated carbon, and applied priorly for a patent (Patent Document 11).

Patent Document 11: Japanese Published Unexamined Patent Application No. H10-37812

In addition, recently, a canister including a combination of an adsorbent with adsorption capacity more than 35 g/L (liter) of n-butane in the n-butane concentration range of 5 percent by volume through 50 percent by volume at 25° C., and an adsorbent with adsorption capacity of 35 g/L or less of n-butane (Patent Document 12).

Patent Document 12: U.S. Pat. No. 6,540,815

The canisters disclosed in Patent Documents 11 and 12 are introduced as being capable of restraining the leak amount of the evaporative emission of the gasoline even when a vehicle is parked for a long period of time by connecting the second canister after the canister using granular activated carbon, and in these patent documents, use of honeycomb-shaped activated carbon as a second canister has been disclosed. However, the honeycomb molding described in Patent Document 11 is produced by extrusion-molding, and this is easily broken. Use of a honeycomb is also described in Patent Document 12, however, it is made of ceramic and easily broken although its pressure drop is low. In recent years, strength against vibrations has been strongly demanded in view of loading in a vehicle, and the problem in strength of the conventional activated carbon honeycombs has been pointed out.

On the other hand, even when fuel vapor from an intake system is adsorbed, the adsorption method using activated carbon as an adsorbent is effective, and an adsorbent is set and used in the middle of the intake manifold or near an air filter as a combustion air inlet. A large amount of air passes through the intake manifold at a high speed, and therefore, in the case of development of a fuel evaporative emission preventing device in such an intake system, as an engine air intake element to be used (hereinafter, abbreviated to air intake element), the lower pressure drop than that of the canister is required.

As the air intake element, for example, use of a monolith with a honeycomb structure obtained by, for example, mixing activated carbon and a ceramic substance and extrusion-molding and calcining these as an adsorptive filter for removing volatile organic compounds from the air intake system of a vehicle engine has been disclosed (Patent Document 13), and use of a phenol resin and cellulose fibers, etc., which have been mixed, extruded into a honeycomb, and then carbonized and activated, for removal of volatile organic compounds, has been disclosed (Patent Document 14). However, these honeycomb moldings are easily broken although their pressure drop is low, so that the problem in strength against vibrations has also been pointed out as in the case of the canisters in view of loading in a vehicle.

Patent Document 13: U.S. Pat. No. 5,914,294

Patent Document 14: U.S. Pat. No. 5,820,967

DISCLOSURE OF INVENTION

Problems to be Solved by the Invention

For use in the second canister and the air intake element, not only a reduction in the leak amount of the gasoline vapor but also low pressure drop and excellent moldability and strength are required. Therefore, an object of the invention is to provide an activated carbon sheet molding that can reduce the leak amount of fuel vapor and has low pressure drop and excellent moldability and strength and a method for producing this, and to provide an element for a fuel evaporative emission preventing device for preventing the release of the fuel evaporative emission from a fuel tank system and an intake system by using said activated carbon sheet molding.

Means for Solving the Problems

In order to achieve the objects, the inventors repeated studies earnestly, found that the object could be achieved by an activated carbon sheet molding made of activated carbon satisfying specific n-butane adsorption capacity, and arrived at this invention. Namely, according to a first aspect of the invention, an activated carbon sheet molding is provided which is made of activated carbon satisfying $b/a=0.3$ through 0.55 when a 100%-concentration n-butane adsorbing amount per 100 parts by weight of activated carbon at 40° C. is defined as a parts by weight and a 1%-concentraion n-butane adsorbing amount is defined as b parts by weight.

According to a second aspect of the invention, an element for a fuel evaporative emission preventing device using the activated carbon sheet molding is provided.

Effects of the Invention

The activated carbon sheet molding according to the invention is preferably molded into a honeycomb shape, and preferably used as a canister in combination with a granular activated carbon. In addition, preferably, by setting the honeycomb-shaped molding near an air filter for an engine and using it as an engine air intake element, gasoline vapor generated from an intake system can be prevented from releasing of the fuel evaporative emission.

BEST MODE FOR CARRYING OUT THE INVENTION

According to the first aspect of the invention, it is required that activated carbon forming the activated carbon sheet molding satisfies a specific n-butane adsorbing amount. Namely, the range of $b/a=0.3$ through 0.55 must be satisfied provided that an n-butane adsorbing amount per 100 parts by weight of the activated carbon is defined as a parts by weight when n-butane with 100% concentration is adsorbed by the activated carbon at 40° C., and a n-butane adsorbing amount per 100 parts by weight of the activated carbon is defined as b parts by weight when n-butane with 1% concentration is adsorbed. If b/a is less than 0.3, the adsorption capacity in a low-concentration region of fuel vapor of gasoline or the like becomes small, and if b/a exceeds 0.55, desorption of fuel vapor of gasoline or the like deteriorates.

The n-butane adsorbing amount a is determined by putting 10 g of activated carbon in a glass column, circulating 100%-concentration n-butane at 1 L/min until it reaches equilibrium, and measuring the n-butane adsorbed amount in weight. The n-butane adsorbing amount b is determined by putting 10 g of activated carbon in a glass column, circulating 1%-concentration n-butane obtained by diluting 100%-concentration n-butane with air at 1 L/min until it reaches equilibrium, and measuring the adsorbed n-butane in weight. The value of b/a of the activated carbon forming the activated carbon sheet molding of the invention is 0.3 through 0.55.

The DBL regulation in California is set in the condition of 40.8° C., and evaporation of liquid fuel such as gasoline occurs in a biased manner to the region of 35° C. or more, so that adsorption capacity at 40° C. is set as a reference in the invention. The n-butane adsorbing amount is measured based on the ASTM-D5228, and generally, a higher adsorbing amount is excellent as adsorption capacity, however, the invention is characterized by finding that an activated carbon sheet molding made of activated carbon satisfying a specific relationship between a 100%-concentration n-butane adsorbing amount and a 1%-concentration n-butane adsorbing amount shows excellent effects in prevention of the evaporative emission of the liquid fuel such as gasoline, in particular, in the leak amount of the evaporative emission of the gasoline restraining when a vehicle is parked for a long period of time.

The carbonaceous material to become a raw material of activated carbon to be used in the invention is not especially limited as long as it forms activated carbon by being activated and satisfies the above-described relationship of the n-butane adsorbing amounts, and is widely selected among plant-based and mineral-based materials, natural materials, and synthetic materials. In detail, as a plant-based carbonaceous material, wood, charcoal, and fruit shells such as coconut shells are available. As a mineral-based carbonaceous material, petroleum-based and/or charcoal-based pitches, and coke are available. As a natural material, natural fibers such as cotton, hemp, etc., regenerated fibers such as rayon, viscous rayon, etc., semisynthetic fibers such as acetate, triacetate, etc., are available. As a synthetic material, a polyamide-based material such as nylon, a polyvinyl alcohol-based material such as vinylon, a polyacrylonitril-based material such as acryl, a polyolefin-based material such as polyethylene, polypropylene, etc., polyurethane, a phenol-based resin, and a vinyl chloride-based resin are available.

The shapes of the carbonaceous material and the activated carbon obtained through activation are not especially limited, and various shapes such as granular, powdery, fiber, and sheet-like shapes can be used. As the fiber-like or sheet-like carbonaceous material, woven fabric, nonwoven fabric, a film, felt, and a sheet-like material of natural cellulose fibers such as cotton, regenerated cellulose fibers such as viscous rayon and polynosic rayon, etc., pulp fibers, polyvinyl alcohol fibers, ethylene vinylalcohol fibers, and phenol fibers, etc., are available.

The carbonaceous material becomes activated carbon by being carbonized and activated, and as carbonizing conditions, for example, conditions in that the carbonaceous material is treated at 300° C. or more while supplying a slight amount of inert gas to, for example, a batch-wise rotary kiln, can be employed. As an activation method, any method such as gas activation and chemical activation can be used. As a gas to be used in the gas activation method, steam, carbon dioxide gas, oxygen, LPG exhaust combustion gas, and a mixture gas of these, etc., are available. The temperature for activating these is employed normally by raising in temperature 300° C. through 1200° C., and preferably 900° C.

As a chemical to be used in the chemical activation method, acids such as sulfuric acid, phosphoric acid, nitric acid, etc., metal hydroxides such as sodium hydroxide, potassium hydroxide, cesium hydroxide, calcium hydroxide, and magnesium hydroxide, etc., and metal chlorides such as calcium chloride and zinc chloride, etc., are available. The temperature for activating these is normally in the range between 30° C. and 800° C. although it depends on the chemical agents to be used.

Activated carbon is molded into various shapes such as a plate shape, single-layer or multi-layer polygonal shape, columnar shape, honeycomb shape, or pleat shape by the known dry method or wet method, processed into an activated carbon sheet molding, and preferably used as an element for a fuel evaporative emission preventing device. As such an element for a fuel evaporative emission preventing device, there is a second canister to be used in a fuel tank system in combination with granular activated carbon, and an air intake element to be used in an intake system by being set in an air intake manifold. An activated carbon sheet molding to be used in a second canister is obtained by dry or wet molding granular or powdery activated carbon of 0.005 mm through 5 mm.

As a dry molding method, it is possible that 1 through 50 parts by weight, preferably 2 through 25 parts by weight of a binder is sufficiently mixed with 100 parts by weight of granular or powdery activated carbon and compressed and molded by using a mold. As a binder, polyethylene, polypropylene, acrylonitril butadiene styrene resin, polyester resins such as PET, and PBT, etc., thermoplastic resins such as nylon, ethylene acryl resin, and PMMA, etc., thermosetting resins such as furan resin and phenol resin, etc., hydrophilic resins such as polyvinyl alcohol resin and eval resin, tar, and pitch are available.

The activated carbon sheet molding of the invention is preferably molded by the wet method in order to produce a thin molding. Namely, the activated carbon sheet molding of the invention is produced by preparing a sheet by, preferably, a wet method and molding it. In detail, a sheet is produced by the wet method by using an emulsion mainly containing activated carbon with a grain diameter of 1 through 100 micrometers, a latex, carboxymethyl cellulose (CMC), and water, and the sheet is dried and molded into an activated carbon sheet molding of the invention.

As a latex, for example, vinyl acetate emulsion, vinyl acetate-ethylene copolymer emulsion, polybutadiene emulsion, and polyvinyl chloride emulsion, etc., are available. The CMC is not especially limited, however, preferably, its etherification degree is 0.5 through 1.0, average polymerization degree is 400 through 2000, and molecular weight is 80,000 through 500,000.

The emulsion mixing ratio is not especially limited, however, for practical use, in terms of weight ratios, 20 through 30 of activated carbon, 35 through 60 of water, 10 through 25 of latex, and 10 through 20 of 3% CMC solution are mixed. The mixture is impregnated with or carried on a sheet-like base material such as polyester nonwoven fabric or the like and molded into an activated carbon sheet. The thickness of the sheet is not especially limited, however, if it is excessively thick, it deteriorates the moldability and increases ventilation resistance, resulting in difficulty in production of fine cells, and if it is excessively thin, it lowers strength, so that for practical use, a sheet having a mass per unit area of 50 through 500 g/m$^2$ and a thickness of 0.1 mm through 2.0 mm are used.

As the sheet-like molding, an activated carbon paper molding obtained by molding activated carbon paper produced by papermaking is more preferably used. Namely, the activated carbon sheet of the invention is also preferably produced by a papermaking method. In detail, an activated carbon sheet (paper) is obtained through papermaking of a slurry-like material obtained by adding 5000 through 10000 parts by weight of water to 100 parts by weight of a mixture made of 40 through 75 weight percent of activated carbon powder with a grain diameter of 1 through 100 micrometers and 25 through 60 weight percent of a binder. According to the papermaking method, further thinner sheets can be produced, and are used in the mass per unit area of 50 through 200 g/m$^2$ and a thickness of 0.05 mm through 1.0 mm.

As a binder, pulp, polyvinyl alcohol-based binders, polyolefin-based binders such as polyethylene and polypropylene, etc., polyester-based binders such as polyethylene terephthalate and polybutylene terephthalate, etc., and heat adhesive binders with a core-in-sheath for musing polyester as a core and polyethylene as a sheath are available. A small amount of fire retardant for improving fire retardation and other third components can be added as appropriate.

As the activated carbon sheet molding, an activated carbon honeycomb molding molded into a honeycomb shape is more preferable. As the activated carbon honeycomb molding, a polygonal honeycomb as shown in FIG. 1 and a corrugated honeycomb as shown in FIG. 2 are illustrated. The polygonal honeycomb is molded by the dry molding by using, for example, a mold, or the activated carbon sheet molding is formed into a desired shape in advance with a roller, and then formed into a polygonal shape by using an adhesive and housed in an activated carbon sheet case, or the activated carbon sheet is wound, or the like.

The corrugated honeycomb is also formed in advance into a desired shape and bonded to an activated carbon sheet which forms a base material. The honeycomb shape is preferably a corrugated honeycomb in terms of easiness in molding. FIG. 3 is a combination of a multi-step corrugated honeycomb of FIG. 2. The cell density in the activated carbon honeycomb molding obtained by molding the activated carbon sheet molding into a honeycomb shape is properly determined by considering the relationship with the length of the activated carbon honeycomb molding since an excessively high cell density requires labor in production and increases pressure drop although adsorption and desorption of fuel vapor are excellent.

The activated carbon sheet molding of the invention shows an effect of restraining the leak amount of gasoline vapor when a vehicle is parked for a period of time. According to the second aspect of the invention, preferably, the sheet molding is molded into a honeycomb and preferably used as an element for a fuel evaporative emission preventing device such as a second canister or an engine air intake element. In detail, the molding is joined to a canister that has a section filled with an adsorbent to be connected to a fuel tank system and used as a second canister. The section may consist of a plurality of sections such as a section made of granular activated carbon excellent in adsorption capacity and a section made of activated carbon excellent in adsorption of low-concentration gasoline vapor. Or, the molding is set as an engine air intake element near an air filter for an engine and adsorbs and desorbs fuel vapor generated from the engine.

The activated carbon sheet molding of the invention is also excellent in strength against vibrations, and if it is naturally dropped on a floor made of concrete from a distance of 1 meter, it is not damaged at all, so that the activated carbon sheet molding is remarkably different from a ceramic-made molding in such a point. In addition, the pressure drop was measured by flowing air at a linear velocity of 1 m/sec at a normal temperature, and as a result, the pressure drop of the activated carbon sheet molding of the invention is as low as being less than 10 Pa.

FIG. 4 is a conceptual diagram when the activated carbon sheet molding of the invention is used as a second canister. In the figure, the reference numeral 1 denotes a canister, 2 denotes a breathable supporter, 3 denotes a separation wall, 4 denotes a purging connect hole, 5 denotes a connect hole on the fuel tank side, 6 denotes a vent hole, 7 denotes activated carbon that is granular or the like and excellent in adsorption of high-concentration gasoline, and 8 and 9 denote activated carbon paper moldings molded into honeycombs excellent in adsorption of low-concentration gasoline. The arrows indicate the moving directions of gasoline vapor during parking.

When the molding is used in an air intake element, it is set on an air intake manifold that is an intake vent of the engine on the rear of the air filter. FIG. 5 is a conceptual diagram when the activated carbon molding molded into a honeycomb or corrugated shape of the invention is used for an air intake element. The arrows indicate the passing directions of gasoline vapor during parking. The reference numeral 10 denotes an air filter, 11 denotes an air intake manifold, 12 denotes an activated carbon sheet molding molded into a honeycomb, and 13 denotes an engine room. Hereinafter, the invention is described in more detail based on examples, however, the invention should not be limited to these.

EXAMPLE 1

1 kg of a raw material obtained by crushing and sieving coconut shell charcoal into 8 through 16 meshes was put in a batch-wise rotary kiln with a capacity of 10 liters, raised in temperature to 900° C. while flowing a slight amount of nitrogen gas, and then activated by introducing carbon dioxide gas at 5 L/min as an activation gas. After 12 hours, the introduction of carbon dioxide gas was stopped, and the material was cooled and taken out. The benzene adsorption capacity of the activated material was measured as 57.0%.

The activated carbon obtained was crushed by a ball mill to a central grain diameter of 50 micrometers, and mixed with pulp and the polyvinyl alcohol (PVA)-based binder KURALON VPB107-1 made by KURARAY CO., LTD., and for improvement in fire retardancy, a PVA-based binder KURALON VPX203 made by KURARAY CO., LTD. at the weight percentages of activated carbon/pulp/VPB/VPX=60/20/10/10, and to 100 parts by weight of the obtained mixture, 4000 parts by weight of water was added and mixed, the obtained slurry material was paper-made into an activated carbon paper molding. The molding was molded into a corrugated shape, whereby the corrugated honeycomb molding shown in FIG. 2 was obtained. The molding was naturally dropped on a floor made of concrete from a height of 1 m, however, it was neither broken nor deformed.

2200 cc of the activated carbon 3GX (packing density: 0.34 g/cc, BWC (ASTM, D5228-92): 15.1 dL, b/a value: 0.25) made by KURARAY CHEMICAL CO., LTD. was used as the activated carbon 7 of FIG. 4, 500 cc of the activated carbon 2GK-C3 (packing density: 0.36 g/cc, BWC (ASTM): 10.3 g/dL, b/a value: 0.26) made by KURARAY CHEMICAL CO., LTD. was used as the activated carbon 8, and the corrugated honeycomb molding formed to have a section of 27 mm×27 mm, a length 100 mm, and a capacity of 73 cc was indicated by the numeral 9 and used at a cell density of 190 cpsi (cell number per 1 inch), and a DBL test was conducted.

The DBL test was conducted based on R. S. Williams, C. R. Clontz, et. al., "Impact and Control of Canister Bleed Emissions," SAE Technical Paper 2001-01-0733. The results are shown in Table 1.

For reference, the value (g) of gasoline working capacity (GWC) is also shown, and GWC is a standard of gasoline adsorption and desorption performance in the activated carbon canister by the method using gasoline vapor instead of butane in BWC. Hereinafter, the method of calculating the GWC value is briefly described. After a certified fuel with RVP (Reid Vapor Pressure) of 9.0 PSI is raised in temperature to 38° C., air is introduced at 200 mL/min, and gasoline vapor is generated by bubbling (generation amount: approximately 40 g/h). The generated gasoline vapor is made to pass through the canister and its output concentration is measured by means of FID gas chromatography, and the timing of reaching 5000 ppm is set as a breakpoint. Purging is started within 10 minutes after breaking down, and dry air of 400 times of the capacity of the canister was made to pass at 15 L/min, whereby gasoline is desorbed. This cycle is repeated 10 times, and from the averages of the adsorbed amounts and desorbed amounts of the last three cycles, the GWC value is calculated.

EXAMPLE 2

Activation was performed in the same manner as in Example 1 except that 4 g/min of water (corresponding to 6.8 L/min in terms of 100° C. steam) was used as an activation gas. After 10 hours, introduction of steam was stopped, and after cooling to a normal temperature while supplying a slight amount of nitrogen, the activated material was taken out. The benzene adsorption capacity of the activated material was measured as 60.5%.

The activated carbon obtained was crushed by a ball mill to a central grain diameter of 50 micrometers, and paper-made by the wet method in the same manner as in Example 1, and then molded into a corrugated shape, whereby a corrugated honeycomb molding was obtained. This molding was naturally dropped on a floor made of concrete from a height of 1 m, however, it was neither broken nor deformed.

As in the case of Example 1, by using the activated carbon 3GX made by KURARAY CHEMICAL CO., LTD. as the activated carbon 7 of FIG. 4, using the activated carbon 2GK-C3 made by KURARAY CHEMICAL CO., LTD. as the activated carbon 8, and using the corrugated honeycomb molding as the reference numeral 9, a DBL test was conducted. The results are shown in Table 1.

EXAMPLE 3

1 kg of a raw material obtained by crushing Australian lignite into 8 through 16 meshes, sieving and carbonizing it in advance in a nitrogen gas at 600° C. was put in a rotary kiln that was similar to one used in Example 1, and raised in temperature to 900° C. while a slight amount of nitrogen gas was supplied, and then activated by introducing carbon dioxide gas as an activation gas at 5 L/min. After 12 hours, introduction of the carbon dioxide gas was stopped, and the material was cooled and taken out. The benzene adsorption capacity of the activated material was measured as 37.0%.

The activated carbon obtained was crushed with a ball mill to a central grain diameter of 50 micrometers, paper-made by the wet method in the same manner as in Example 1, and then molded into a corrugated shape, whereby a corrugated honeycomb molding was obtained. This molding was naturally dropped on a floor made of concrete from a height of 1 m, however, it was neither broken nor deformed. In the same manner as in Example 1, by using the activated carbon 3GX made by KURARAY CHEMICAL CO., LTD. as the activated carbon 7 of FIG. 4, using the activated carbon 2GK-C3 made by KURARAY CHEMICAL CO., LTD. as the activated carbon 8, and using the corrugated molding as the reference numeral 9, a DBL test was conducted. The results are shown in Table 1.

COMPARATIVE EXAMPLE 1

Activation was performed in the same manner as in Example 2 except that a commercially available charcoal was used, and after 12 hours, introduction of carbon dioxide gas was stopped and the material was cooled and taken out. The benzene adsorption capacity of the activated material was measured as 29.2%.

The activated carbon obtained was crushed with a ball mill to a central grain diameter of 50 micrometers, paper-made by the wet method in the same manner as in Example 1, and thereafter, molded into a corrugated shape, whereby a corrugated honeycomb molding was obtained. In the same manner as in Example 1, by using the activated carbon 3GX made by KURARAY CHEMICAL CO., LTD. as the activated carbon 7 of FIG. 4, using the activated carbon 2GK-C3 made by KURARAY CHEMICAL CO., LTD. as the activated carbon 8, and using the corrugated honeycomb molding as the reference numeral 9, a DBL test was conducted. The results are shown in Table 1.

COMPARATIVE EXAMPLE 2

1.5 liters of concentrated phosphoric acid solution was added to and impregnated in 1 kg of a scob of pine or the like and mellowed for a whole day and night. Then, it was put in a rotary kiln similar to that of Example 1, raised in temperature from a normal temperature to 600° C. for three hours while supplying a slight amount of nitrogen, activated, and then cooled. The activated material was taken out, phosphoric acid was removed by washing the material with warm water, and then the material was dried. The benzene adsorption capacity after drying was 56.3%.

The activated carbon obtained was crushed with a ball mill to a central grain diameter of 50 micrometers, paper-made by the wet method in the same manner as in Example 1, and thereafter, molded into a corrugated shape, whereby a corrugated honeycomb molding was obtained. In the same manner as in Example 1, by using the activated carbon 3GX made by KURARAY CHEMICAL CO., LTD. as the activated carbon 7 of FIG. 4, using the activated carbon 2GK-C3 made by KURARAY CHEMICAL CO., LTD. as the activated carbon 8, and using the corrugated honeycomb molding as the reference numeral 9, a DBL test was conducted. The results are shown in Table 1.

COMPARATIVE EXAMPLE 3

1 kg of a raw material obtained by crushing Chinese bituminous coal into 8 through 16 meshes, sieving and carbonizing it in advance at 600° C. in a nitrogen gas, was put in a rotary kiln similar to that of Example 1 and raised in temperature to 900° C. while supplying a slight amount of nitrogen gas, and then activated by introducing water as an activation gas at 4 g/min (corresponding to 6.8 L/min in terms of 100° C. steam). After 12 hours, introduction of steam was stopped, and the material was cooled and taken out. The benzene adsorption capacity of the activated material was measured as 39.2%.

The activated carbon obtained was crushed by a ball mill to a central grain diameter of 50 micrometers, and paper-made by the wet method in the same manner as in Example 1, and then molded into a corrugated shape, whereby a corrugated honeycomb molding was obtained. As in the case of Example 1, by using the activated carbon 3GX made by KURARAY CHEMICAL CO., LTD. as the activated carbon 7 of FIG. 4, using the activated carbon 2GK-C3 made by KURARAY CHEMICAL as the activated carbon 8, and using the corrugated honeycomb molding as the reference numeral 9, a DBL test was conducted. The results are shown in Table 1.

COMPARATIVE EXAMPLE 4

A DBL test was conducted in the case where the activated carbon 3GX made by KURARAY CHEMICAL CO., LTD. was used as the activated carbon 7 of FIG. 4, the activated carbon 2GK-C3 made by KURARAY CHEMICAL CO., LTD. was used as the activated carbon 8, and the location of 9 was blank. The results are shown in Table 1.

EXAMPLE 4

A total of 2700 cc of the activated carbon 3GX made by KURARAY CEHMICAL was filled as the activated carbons

7 and 8 of FIG. 4. By using the same corrugated honeycomb molding 9 as in Example 1 as the corrugated honeycomb molding, a DBL test was conducted. The results are shown in Table 1.

COMPARATIVE EXAMPLE 5

A corrugated honeycomb molding was formed in the same manner as in Example 1 except that the introduction of carbon dioxide gas was stopped after 6 hours. The benzene adsorption capacity was 35.0%. The results are shown in Table 1.

COMPARATIVE EXAMPLE 6

A corrugated honeycomb molding was formed in the same manner as in Example 2 except that the introduction of steam was stopped after 18 hours. The benzene adsorption capacity was 85.0%. The results are shown in Table 1.

calculated by passing air at a linear velocity of 1 m/sec at a normal temperature. The strength was judged based on the degree of breakage of the molding when it was naturally dropped on a floor made of concrete from a height of 1 m. The results of these are shown in Table 2. For evaluation, a n-butane adsorbing amount of 1 g or more for gasoline vapor generated from an intake system and pressure drop of 10 Pa or less for minimizing its influence on the intake efficiency were set as standards.

EXAMPLE 6

A corrugated honeycomb molding with a cell density of 120 cpsi similar to that used in Example 5 was cut into a 100 mm square with a length of 20 mm, and the n-butane adsorbing amount and the pressure drop were measured under the

TABLE 1

| | Activated carbon 7 | Volume of 7 (cc) | Activated carbon 8 | Volume of 8 (cc) | Activated carbon 9 Carbonaceous material/ Activator | Volume of 9 (cc) | Adsorbing amount wt % 100 V/V % (a) | 1 V/V % (b) | b/a | DBL (mg-butane) | GWC | Suitability | Drop test |
|---|---|---|---|---|---|---|---|---|---|---|---|---|---|
| Example 1 | 3GX | 2200 | 2GK-C3 | 500 | Coconut shell/carbon dioxide gas | 73 | 42.5 | 16.8 | 0.395 | 2.1 | 200.1 | Suitable | Not broken |
| Example 2 | 3GX | 2200 | 2GK-C3 | 500 | Coconut shell/water vapor | 73 | 45.0 | 16.0 | 0.358 | 1.4 | 202.3 | Suitable | Not broken |
| Example 3 | 3GX | 2200 | 2GK-C3 | 500 | Lignite/carbon dioxide gas | 73 | 25.1 | 9.2 | 0.367 | 2.5 | 200.4 | Suitable | Not broken |
| Example 4 | 3GX | 2200 | 3GX | 500 | Coconut shell/carbon dioxide gas | 73 | 42.5 | 16.8 | 0.395 | 4.5 | 212.1 | Suitable | Not broken |
| Comparative example 1 | 3GX | 2200 | 2GK-C3 | 500 | Charcoal/water vapor | 73 | 18.4 | 12.2 | 0.663 | 11.1 | 199.2 | Unsuitable | Not broken |
| Comparative example 2 | 3GX | 2200 | 2GK-C3 | 500 | Scob/phosphoric acid | 73 | 41.8 | 11.5 | 0.275 | 10.5 | 197.5 | Unsuitable | Not broken |
| Comparative example 3 | 3GX | 2200 | 2GK-C3 | 500 | Bituminous coal/water vapor | 73 | 23.3 | 6.8 | 0.292 | 12.2 | 198.2 | Unsuitable | Not broken |
| Comparative example 4 | 3GX | 2200 | 2GK-C3 | 500 | — | — | — | — | — | 15.1 | 197.1 | Unsuitable | Not broken |
| Comparative example 5 | 3GX | 2200 | 2GK-C3 | 500 | Coconut shell/carbon dioxide gas | 73 | 22.0 | 13.5 | 0.614 | 12.8 | 198.2 | Unsuitable | Not broken |
| Comparative example 6 | 3GX | 2200 | 2GK-C3 | 500 | Coconut shell/water vapor | 73 | 52.0 | 15.0 | 0.288 | 12.3 | 199.5 | Unsuitable | Not broken |

EXAMPLE 5

The material paper-made in Example 2 was molded into a corrugated shape, whereby a corrugated honeycomb molding with a cell density of 120 cpsi was obtained. This corrugated honeycomb molding was cut into a 100 mm square with a length of 10 mm, horizontally attached to a container with an internal size of 100 mm square and a length of 300 mm so as not to create gaps on its periphery, 5 percent by volume of n-butane was flown upward at 100 mL/min (0.0539 g/min in terms of n-butane), and the n-butane concentration on the outlet side was measured. From the adsorption time until the inlet side concentration reached 10%, an n-butane adsorbing amount was calculated. In addition, the pressure drop was same conditions as in Example 5. In addition, a drop test was conducted, and the results of these are shown in Table 2.

EXAMPLE 7

A corrugated honeycomb molding with a cell density of 190 cpsi similar to that used in Example 5 was cut into a 100 mm square with a length of 10 mm, and the n-butane adsorbing amount and pressure drop were measured under the same conditions as in Example 5. In addition, a drop test was conducted, and the results of these are shown in Table 2.

COMPARATIVE EXAMPLE 7

An engine air intake element having an adsorbing layer made of the activated carbon 3GX made by KURARAY CHEMICAL CO., LTD. was used. When the amount of use was reduced, the adsorption capacity became insufficient, and when the amount of use was increased, the pressure drop became high.

COMPARATIVE EXAMPLE 8

As a commercially available ceramic honeycomb activated carbon formed by extrusion molding, four of the product name KURANICA ACH2-LX52C (74 mm vertically×68 mm horizontally×10 mm height, 300 cpsi) are bonded in parallel by an adhesive, and then cut into a size of 100 mm vertically× 100 mm horizontally with a thread saw, and its n-butane adsorbing amount and pressure drop were measured. In addition, a drop test was also conducted, and the results of this are shown in Table 2.

TABLE 2

|  | n-butane adsorbing amount (g) | pressure drop (Pa) | Drop test | Total evaluation |
|---|---|---|---|---|
| Example 5 | 1.35 | 4.5 | Not broken | Excellent |
| Example 6 | 2.82 | 6.2 | Not broken | Excellent |
| Example 7 | 1.81 | 9.7 | Not broken | Excellent |
| Comparative example 7 | 3.5 | 80.0 | Not broken | Defective |
| Comparative example 8 | 1.23 | 5.1 | Broken | Defective |
| Evaluation criteria | >1.0 | <10.0 | Not broken | — |

INDUSTRIAL APPLICABILITY

The invention provides an activated carbon sheet molding excellent in adsorption and desorption of organic solvent vapors or vapors evaporating from liquid fuel such as gasoline, a method for producing the activated carbon sheet molding, and an element for a fuel evaporative emission preventing device. The activated carbon sheet molding of the invention is preferably molded into a honeycomb shape, and preferably used as a second canister in combination with a granular activated carbon. By setting the activated carbon sheet molding molded into a honeycomb near an air filter for an engine and using it as an air intake element, evaporative emission of gasoline vapor from an intake system can be prevented.

DESCRIPTION OF SYMBOLS

Figure 1:
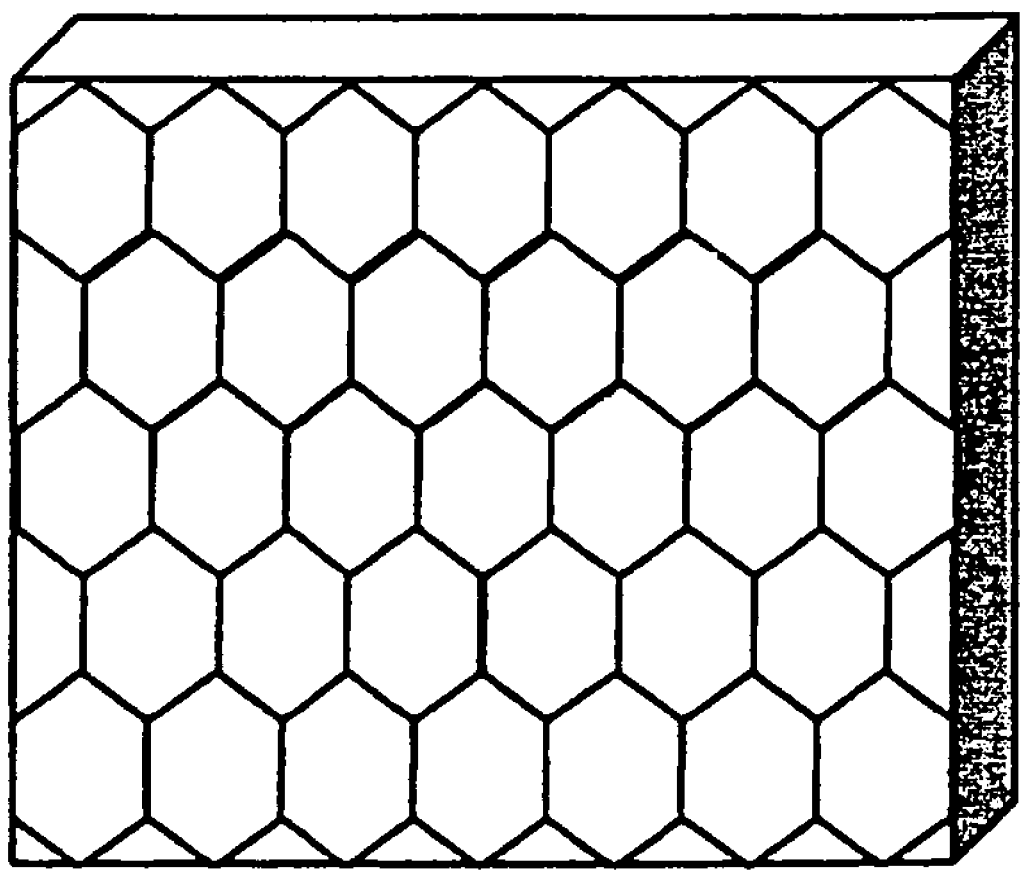
FIG. 1 is an example of a polygonal honeycomb molding obtained by molding an activated carbon sheet molding of the invention into a honeycomb with a polygonal structure.
Figure 2:
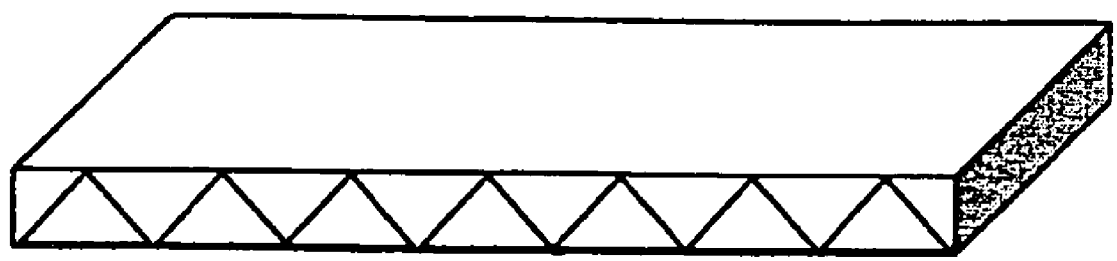
FIG. 2 is an example of a corrugated honeycomb molding obtained by molding the activated carbon sheet molding of the invention into a corrugated shape.
Figure 3:
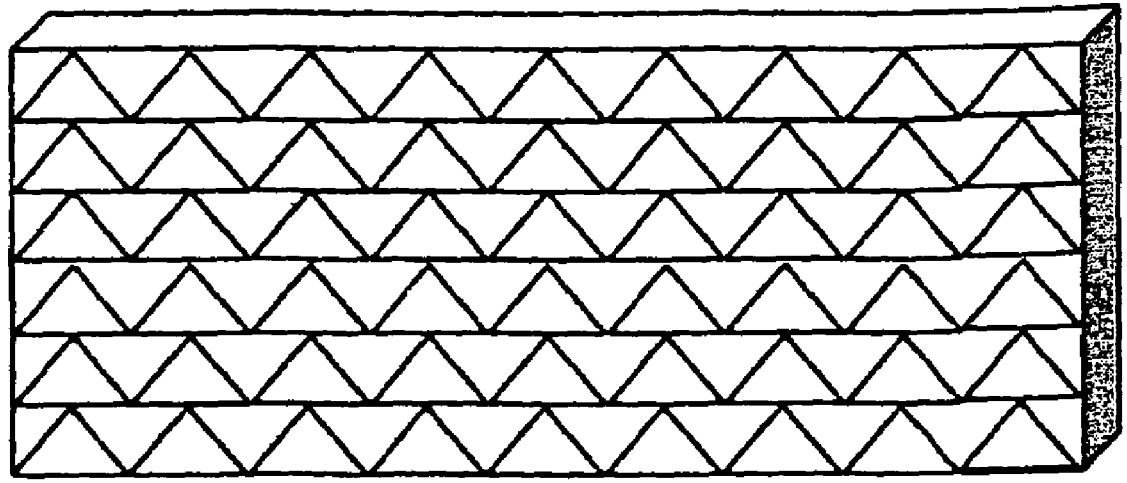
FIG. 3 is a schematic view of a corrugated honeycomb molding formed to have a multi-step form.
Figure 4:
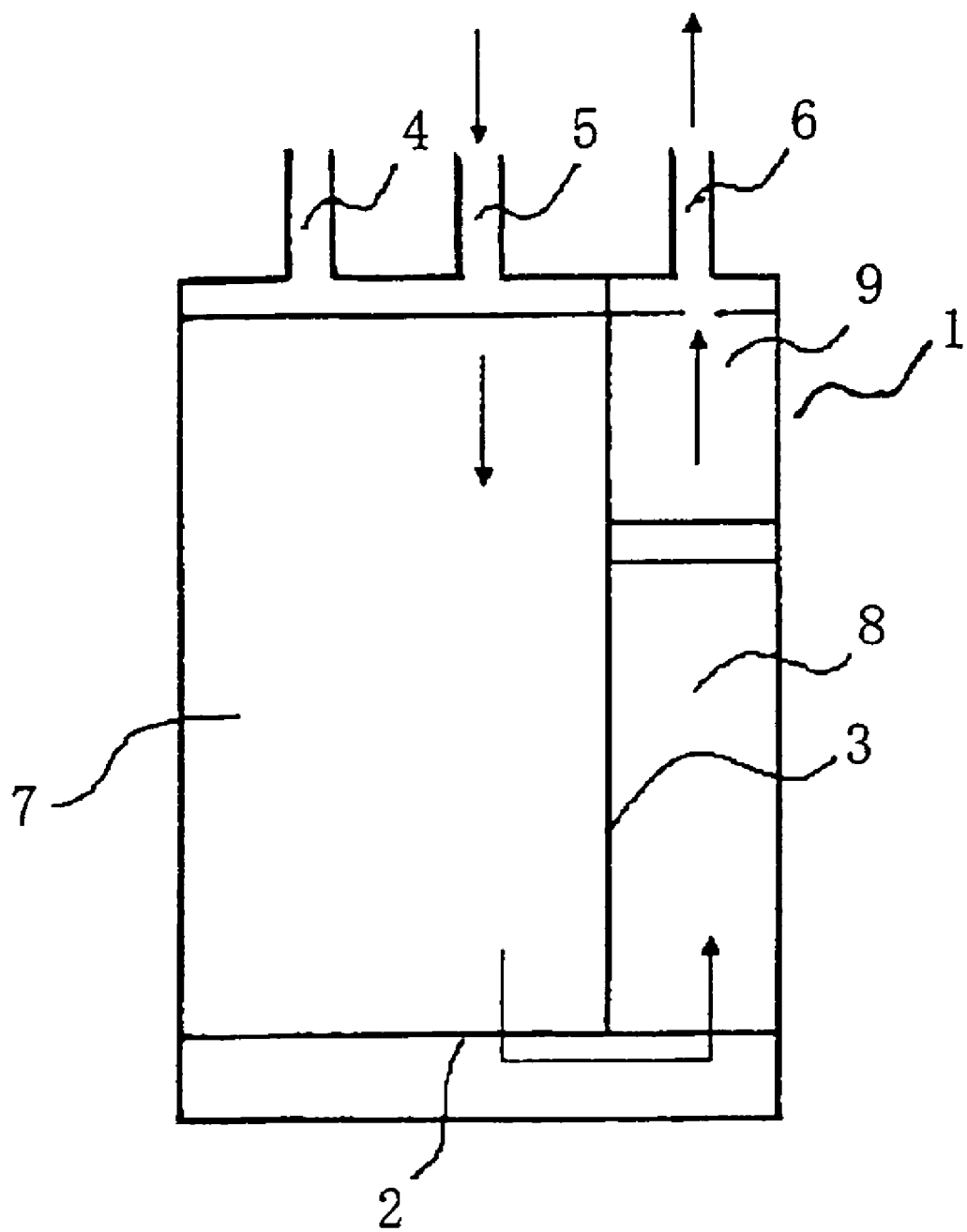
FIG. 4 is a conceptual diagram when using the activated carbon sheet molding of the invention as a second canister.
Figure 5:
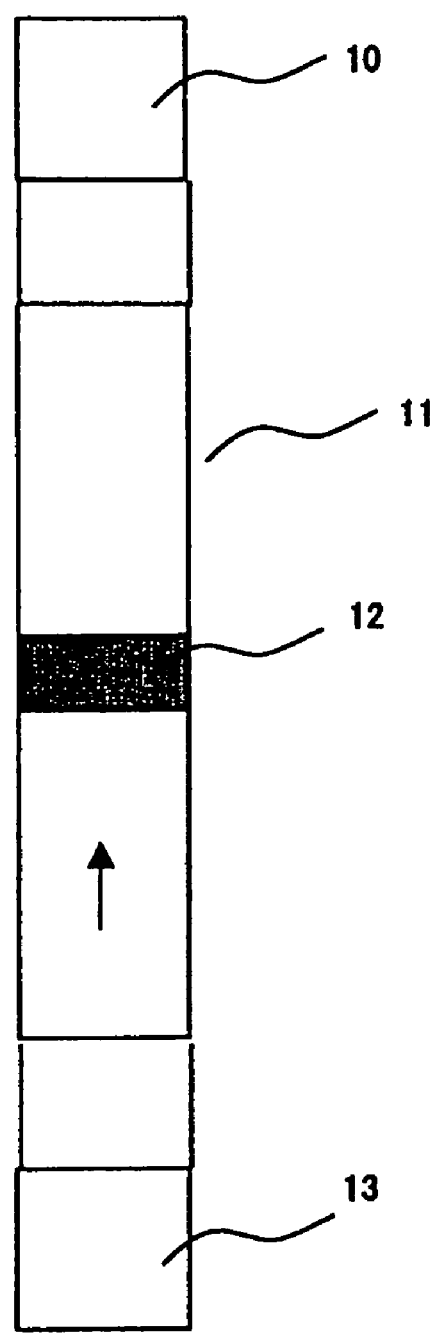
FIG. 5 is a conceptual diagram when using the activated carbon sheet molding of the invention as an air intake element.

1 Canister
2 Breathable supporter
3 Separation wall
4 Purging connect hole
5 Connect hole on the fuel tank side
6 Vent hole
7 Activated carbon excellent in adsorption of high-concentration gasoline
8 Activated carbon excellent in adsorption of low-concentration gasoline
9 Activated carbon paper molding excellent in adsorption of low-concentration gasoline
10 Air filter
11 Air intake manifold
12 Activated carbon paper molding
13 Engine room

What is claimed is:

1. An element, comprising a honeycomb-shaped activated carbon paper obtained by molding a composition comprising a binder and an activated carbon satisfying b/a=0.3 through 0.55, wherein "a" is the n-butane adsorbing amount per 100 parts by weight of activated carbon at 40° C. at the concentration of n-butane being 100%, wherein "a" is measured in parts by weight, and wherein "b" is n-butane adsorbing amount per 100 parts by weight of activated carbon at 40° C. at concentration of n-butane being 1%, wherein "b" is measured in parts by weight,
wherein the binder comprises pulp and at least one polyvinyl alcohol (PVA)-based binder fiber providing fire retardancy, and the activated carbon can adsorb a gasoline vapor and desorb the absorbed gasoline vapor.

2. The element according to claim 1, wherein the honeycomb-shaped paper is a corrugated honeycomb.

3. The element according to claim 1, wherein the honeycomb-shaped activated carbon paper is a fuel vapor adsorbing layer.

4. The element according to claim 3, wherein the adsorbing layer is a plurality of connected adsorbing layers.

5. The element according to claim 1, formed by molding an activated carbon obtained by paper-making and drying slurry obtained by adding water to a mixture of granular or powdery activated carbon and the binder.

6. The element according to claim 1, wherein the element is a second canister connected consecutively to a first canister comprising granular activated carbon.

7. The element according to claim 1, wherein the element is an engine air intake element.

8. The element according to claim 1, wherein the binder comprises the pulp and two polyvinyl alcohol (PVA)-based binder fibers, a ratio of the activated carbon/pulp/first PVA/second PVA is 60/20/10/10, and the second PVA-based binder fiber provides fire retardancy.

9. An element comprising a honeycomb-shaped activated carbon paper obtained by a method comprising:
activating a raw material by introducing carbon dioxide gas at 5 L/min for 12 hours at a temperature from 900 to 1200° C.,
cooling said material to a normal temperature,
conducting a paper-making process of the activated material and a binder,
obtaining the honeycomb-shaped activated carbon paper, and
inserting the honeycomb-shaped activated carbon paper into a canister or an engine air intake element,
wherein the raw material is a carbon material comprising coconut shell, charcoal and/or lignite, and the activated carbon material satisfying b/a=0.3 through 0.55, wherein "a" is the n-butane adsorbing amount per 100 parts by weight of activated carbon material at 40° C. at the concentration of n-butane being 100%, wherein "a" is measured in parts by weight, and wherein "b" is n-butane adsorbing amount per 100 parts by weight of activated carbon material at 40° C. at concentration of n-butane being 1%, wherein "b" is measured in parts by weight, and wherein the binder comprises pulp and at least one polyvinyl alcohol (PVA)-based binder fiber possessing fire retardancy, and the activated carbon material can adsorb a gasoline vapor and desorb the absorbed gasoline vapor.

10. The element according to claim 9, wherein the binder comprises the pulp and two polyvinyl alcohol (PVA)-based binder fibers, a ratio of the activated carbon/pulp/first PVA/second PVA is 60/20/10/10, and the second PVA-based binder fiber provides fire retardancy.

11. An element, comprising a honeycomb-shaped activated carbon paper obtained by a method comprising:

activating a raw material by introducing water as an activating gas at 4 g/min corresponding to 6.8 L/min in terms of 100° C. for 10 hours, cooling the material to a normal temperature, conducting a paper-making process of the activated material and a binder, obtaining the honeycomb-shaped activated carbon paper, and inserting the honeycomb-shaped activated carbon paper into a canister or an engine air intake element, wherein the raw material is a carbon material comprising coconut shell, charcoal and/or lignite, and honeycomb-shaped activated carbon paper is made of the activated carbon material satisfying b/a=0.3 through 0.55 when 100%-concentration n-butane adsorbing amount per 100 parts by weight of activated carbon material at 40° C. is defined as a parts by weight and a 1%-concentration n-butane adsorbing amount is defined as b parts by weight, and wherein the binder comprises pulp and at least one polyvinyl alcohol (PVA)-based binder fiber possessing fire retardancy, and the activated carbon material can adsorb a gasoline vapor and desorb the absorbed gasoline vapor.

12. The element according to claim 11, wherein the binder comprises the pulp and two polyvinyl alcohol (PVA)-based binder fibers, a ratio of the activated carbon/pulp/first PVA/second PVA is 60/20/10/10, and the second PVA-based binder fiber provides fire retardancy.

* * * * *